US012337926B2

(12) United States Patent
Looney

(10) Patent No.: US 12,337,926 B2
(45) Date of Patent: Jun. 24, 2025

(54) METHOD AND APPARATUS FOR STABILIZING FRONT FORK SUSPENSION OF A BIKE

(71) Applicant: Countershox LLC, Olathe, KS (US)

(72) Inventor: Nathan Looney, Olathe, KS (US)

(73) Assignee: Countershox LLC, Olathe, KS (US)

( * ) Notice: Subject to any disclaimer, the term of this patent is extended or adjusted under 35 U.S.C. 154(b) by 765 days.

(21) Appl. No.: 17/455,962

(22) Filed: Nov. 22, 2021

(65) Prior Publication Data

US 2023/0159133 A1   May 25, 2023

(51) Int. Cl.
  *B62K 25/08*  (2006.01)
  *B62K 21/02*  (2006.01)
  *F16F 15/02*  (2006.01)

(52) U.S. Cl.
  CPC .............. *B62K 25/08* (2013.01); *B62K 21/02* (2013.01); *F16F 15/02* (2013.01); *B62K 2201/04* (2013.01)

(58) Field of Classification Search
  CPC .... B62K 25/08; B62K 21/02; B62K 2201/04; F16F 15/02; F16F 2234/02; F16F 7/116
  See application file for complete search history.

(56) References Cited

U.S. PATENT DOCUMENTS

| 8,342,489 | B1 | 1/2013 | Richardson et al. |
| 9,989,112 | B1 | 6/2018 | Lethorn et al. |
| 10,745,076 | B2 | 8/2020 | Walker et al. |
| 2012/0298437 | A1 | 11/2012 | Dietz |
| 2015/0367492 | A1* | 12/2015 | Lindell ................. B25D 17/24 173/211 |
| 2019/0291811 | A1* | 9/2019 | Lindeman ............ F16F 13/002 |
| 2022/0126945 | A1* | 4/2022 | Chen ..................... B62K 21/20 |

OTHER PUBLICATIONS

Purdue, "Vibrations: Embry-Riddle Aeronautical University, Vibration Absorption," retrieved from the internet on Oct. 18, 2021, 3 pages, available at https://www.purdue.edu/freeform/ervibrations/chapter-v-animations/vibration-absorption/.
Russell, "Acoustics and Vibration Animations, The Dynamic Vibration Absorber," retrieved from the internet on Oct. 18, 2021, 2 pages, available at https://www.acs.psu.edu/drussell/Demos/absorber/DynamicAbsorber.html.
YouTube, "Pirro slow motion oversuspension," published Sep. 23, 2019, 1 page, available at https://www.youtube.com/watch?v=afa9L2ocZPY.

* cited by examiner

*Primary Examiner* — Valentin Neacsu
*Assistant Examiner* — Abigail R Hymel
(74) *Attorney, Agent, or Firm* — Suiter Swantz IP

(57) ABSTRACT

A suspension stabilizer and method are described which may be attached to a bike having front fork suspension to improve handling and reduce rider fatigue. The suspension stabilizer may include a counterweight, a spring assembly and a guide assembly. The spring assembly may be arranged to provide a spring force between the counterweight and the guide assembly to resist linear motion of the counterweight along a guide assembly axis. The counterweight and spring assembly may have a natural motion frequency of 3 to 15 Hertz and may be based on one or more characteristics of the front fork suspension.

20 Claims, 12 Drawing Sheets

METHOD AND APPARATUS FOR STABILIZING FRONT FORK SUSPENSION OF A BIKE

BACKGROUND

Description of the Related Art

Many bikes are intended for use that includes riding off-road. During off-road riding, bikes typically encounter ground terrain that is rough, including terrain with rocks, roots, bumps, ledges, drop-offs and/or other things that impact the handling of the bike and the comfort of the rider. Bikes can include suspension to soften the ride for the rider and to provide for better control of the bike over rough terrain when compared to a bike that does not include suspension.

Bikes may include front suspension in the form of forks. Forks typically include upper and lower fork tubes, one or more springs and a damping system. The springs include coil type springs made from metal or may include springs that use a gas, such as air. In fork suspension the upper and lower fork tubes are typically cylindrical with one or the other of the upper and lower fork tubes having a diameter that is larger than the other of the upper and lower fork tubes. The upper and lower fork tubes have a shared center axis along which the fork tubes move relative to one another in a linear motion. When the upper fork tube diameter is larger than the lower fork tube diameter, such as in many modern bikes, the lower fork tube slides within the upper fork tube while the spring provides resistance to compressive movement. The damping system may control how fast the fork compresses or rebounds.

The spring(s) and damping system in forks can be selected depending on the type of terrain for which the bike is intended to be used. When the bike is going to be used for terrain having large jumps the forks may have a spring(s) that is relatively stiffer and the damping system may be set to provide a relatively greater damping force. When the bike is going to be used for terrain having mostly smaller bumps such as rocks and roots, the forks may have a spring(s) that are relatively softer and the damping system may be set to provide a relatively smaller damping force.

In either set up the spring(s) and damping are typically a compromise focused on what is typically encountered by the bike.

SUMMARY

A suspension stabilizer and processes for making and using same are provided. In some examples, the suspension stabilizer may be configured to stabilize front fork suspension of a bike. The suspension stabilizer may comprise a counterweight having a weight that is in a range of 0.25 to 5 pounds, the counter weight including a first surface portion and a second surface portion. The suspension stabilizer may include a guide assembly having a body defining a guide path along a guide assembly axis. The guide path may be configured to receive the counterweight and to guide the counterweight for movement in a linear motion along the guide assembly axis. The guide assembly may include a first end, and a second end, and the body extends between the first end and the second end. The suspension stabilizer may include a spring assembly arranged to provide a spring force between the counterweight and the guide assembly to resist linear motion of the counterweight along the guide assembly axis. The counterweight and spring assembly may have a natural motion frequency of 3 to 15 Hertz. The suspension stabilizer may include a mounting assembly configured to attach the guide assembly to a bike in an orientation in which the guide assembly axis is substantially parallel to an axis of linear motion of lower fork legs of the forks relative to upper fork legs of the forks.

In one or more embodiments, a method may comprise producing a counterweight to have a weight that is in a range of 0.25 pounds to 5 pounds. A guide assembly may be formed with a body defining a guide path along a guide assembly axis. The guide assembly may be formed to receive the counterweight and to guide the counterweight for movement in a linear motion along the guide assembly axis. The guide assembly may include a first end, and a second end, and the body extends between the first end and the second end. A spring assembly may be configured to provide a spring force between the counterweight and the guide assembly to resist linear motion of the counterweight along the guide assembly axis. The spring assembly may selected to have a spring rate such that the spring assembly and counterweight have a natural motion frequency of 3 to 15 Hertz. A mounting assembly may be arranged to connect the guide assembly to a front portion of a bike having front fork suspension in an orientation in which the guide assembly axis is substantially parallel to an axis of linear motion of lower fork legs of the forks relative to upper fork legs of the forks.

In one or more embodiments, a suspension stabilizer may be configured for connection to a front portion of a bike to stabilize front fork suspension of the bike. The suspension stabilizer may include a counterweight having a weight that is in a range of 0.25 to 5 pounds. The suspension stabilizer may include a guide assembly having a guide assembly axis and the guide assembly may be connected to the counterweight such that the counterweight is moveable in a linear motion along the guide assembly axis without becoming detached from the guide assembly. The suspension stabilizer may include a spring assembly connected to the guide assembly and positioned such that the spring assembly resists linear motion of the counterweight along the guide assembly axis in at least one direction. The spring assembly may include a spring rate such that the counterweight and spring assembly have a natural motion frequency of 4 to 10 Hertz.

DETAILED DESCRIPTION

Figure 1:
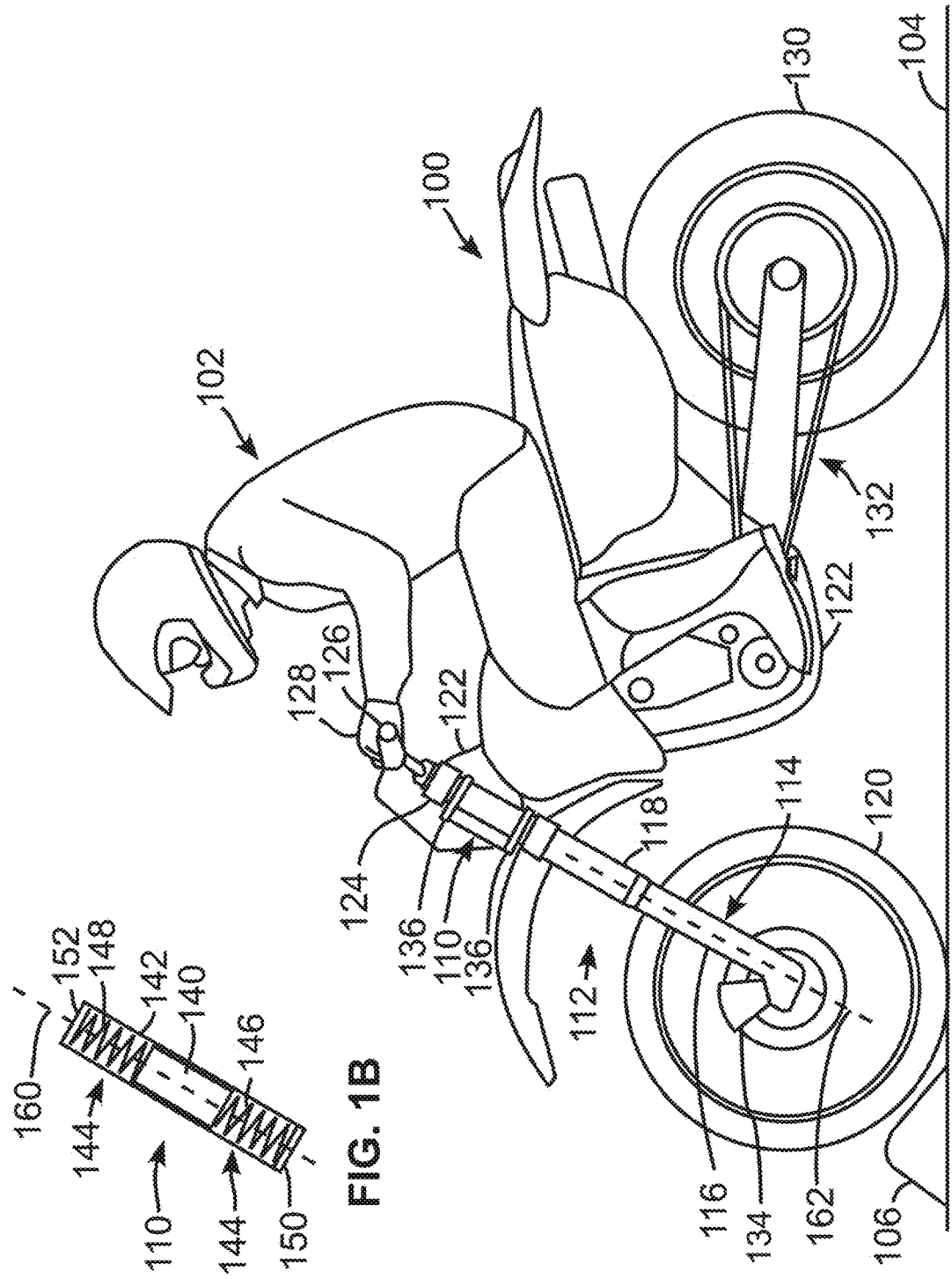
FIG. 1A depicts an illustration of a bike including a suspension stabilizer, according to one or more embodiments described.
FIG. 1B depicts a diagrammatic cut-away view of the suspension stabilizer shown in FIG. 1A in a neutral position.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

The term bike, as used herein, means a motorcycle and/or a bicycle. Bikes are two wheeled vehicles that a user (usually called a rider) rides by straddling with one leg on either side. The term "bike" as used herein is a term that can encompass bicycles and motorcycles. Bikes can include pedals, electrical motors and/or fuel powered engines, such as combustion engines for providing drive power.

The terms "left" and "right" when used herein refer to the left and right sides from the perspective of the rider when straddling the bike. The terms "front" and "back" or "rear" are also from the perspective of the rider when straddling the bike. Ranges described herein are inclusive, so for example, a range of X to Y includes the values of X and Y.

FIG. 1A depicts a bike 100 that a rider 102 may ride over ground 104 which may be rough and may include terrain with rocks, roots, bumps, ledges, drop-offs, jumps, whoops and/or other things that impact the handling of the bike and the comfort of the rider, an example of which is represented in FIG. 1A by a bump 106. The bump 106 is shown of illustrative purposes and is representative of terrain that may be encountered by the bike 100 when ridden. A suspension stabilizer 110 may be mounted to the bike 100 at or near a front suspension 112 of the bike 100 to stabilize the front suspension 112 of the bike 100. In some examples, such as the example shown in FIG. 1A, the front suspension 112 may be forks 114 that include two lower fork tubes 116 and two upper fork tubes 118, FIG. 1A shows the left lower fork tube 116 and left upper fork tube 118, although the forks 114 also include a right lower fork tube and a right upper fork tube. The forks 114 may be connected to a front wheel 120 of the bike and the forks 114 may be connected to a frame 122 of the bike 100 using fork clamps 124 which may also be attached to handlebars 126. The rider 102 may use the handlebars 126 to hold on to the bike 100 with their hands 128 and may use the handlebars 126 for control of the front wheel 120 of the bike 100. In some examples, the bike 100 may also include a rear wheel 130 that is connected to the bike frame 122 through rear suspension 132.

The forks 114 may include one or more springs which can be inside the lower fork tube 116 and/or upper fork tube 118. The forks 114 may also include compression damping and rebound damping to control how the spring(s) in the forks 114 are compressed and decompressed (or extended), respectively when the front wheel 120 contacts the bump 106. The spring(s) may be selected or set to support the weight of the bike 100 and rider 102. In some examples the spring(s) may be selected or set to have a compression that may be referred to as riding sag when the fork 114 and rear suspension 132 are supporting the rider 102, the frame 122 and other components of the bike 100. The riding sag, also called natural sag, is when the bike 100 suspension is settled with the rider 102 on the bike 100 and no external forces acting on the suspension other than gravity. Riding sag may be seen when the rider 102 is riding the bike 100 on flat ground and is not accelerating or decelerating. The bike 100 is shown in FIG. 1A with the suspension, that is the front suspension 112 and rear suspension 132, at riding sag.

The suspension stabilizer 110 may include a mounting assembly 136 which may be used to attach the suspension stabilizer 110 to the bike 100. In the examples shown in FIG. 1 through FIG. 9 the suspension stabilizer 110 is shown mounted to the upper fork tube 118 using the mounting assembly 136.

The suspension stabilizer 110 may reduce how much of an impact of a bump 106 at the front wheel 120 is transferred through the forks 114 to the handlebars 126 then to the rider's hands 128. By reducing the impact felt by the rider 102, the rider 102 may have better control of the bike 100. Sharp or sudden impacts with a large force may tend to make the rider lose their grip on the handlebars 126 or may move the rider's hands. This can result in a less safe ride and may even cause the rider 102 to lose control of the bike 100 momentarily. In some situations, the rider may compensate by holding on to the handlebars 126 tighter when they feel their grip on the handlebars 126 slip or move. This can cause the rider 102 to become fatigued quickly and may cause the rider 102 to experience arm pump which can cause a rider to have difficulties holding on to the handlebars. The suspension stabilizer 110 may also reduce injury caused by long term repetitive impacts by reducing the severity of the impacts. Other benefits may also be provided by the suspension stabilizer 110.

The suspension stabilizer 110 may also provide other benefits. In some examples bike forks 114 may have a resonant frequency at which they try to oscillate. This may be a result of the fork spring (not shown) and the unsprung weight of the front wheel 120, front brake 134 and lower fork tubes 115. The weight of the fork springs and other components may also contribute to the unsprung weight. In some examples, the resonant frequency of the forks may be from 3 to 8 Hertz (Hz); from 3 to 10 Hz; from 3 to 15 Hz; from 4 to 10 Hz; from 4 to 11 Hz; or other ranges which may be determined by measurement. Some frequencies of vibration that are transferred from the front wheel 120 to the handlebars 126 are easier for the rider 102 to manage than other frequencies, and some frequency inducing impacts or bumps are managed by the front wheel 120 or the forks 114 better than other frequencies. For example, frequencies of about 15 Hz to about 20 Hz may be absorbed by the front tire and therefore don't reach the handlebars 126. As another example, frequencies of about 100 Hz at the handlebars 126 do not appear to bother riders. As another example, the rider 102 may be able to manage oscillations at the handlebars 126 for frequencies that are less than about 3 Hz by letting their arms and/or legs move along with the motion. An example of oscillations that are less than about 3 Hz may be large sand roller type bumps. However, riders may have difficulties handling oscillations at the handlebars 126 that are at or above about 3 Hz and at or below about 15 Hz. Riders may tend to try to fight to control the bike 100 when the handlebars 126 are oscillating in these frequencies. This may lead to rider fatigue and loss of some control over the bike 100. The suspension stabilizer 100 may absorb oscillations in the frequencies that are difficult for the rider 102 to handle.

FIG. 1B depicts a diagrammatic cut-away view of the suspension stabilizer 110 shown in FIG. 1A. Suspension stabilizer 110 may include a counterweight 140, a guide assembly 142 and a spring assembly 144. A spring rate of spring assembly 144 and/or the weight of the counterweight 140 may be selected such that the spring assembly 144 and counterweight 140 have a natural motion frequency of 3 to 15 Hz. In some examples, the spring rate of the spring assembly 144 and/or the weight of the counterweigh 140 may be selected using a formula (1):

$$f = \sqrt{\frac{k}{m}}/2\pi \quad (1)$$

In some examples, the weight of the counterweight 140 may be in a range of 1 pound to 2 pounds and the bike may be a motorcycle. In some examples, the weight of the counterweight 140 may be in a range of 0.25 pounds and 0.75 pounds and the bike may be a bicycle. In some examples, the weight of the counterweight may be determined based at least in part on the weight of the bike.

In the example shown in FIG. 1A the spring assembly 144 includes a lower (first) stabilizing spring 146 and an upper (second) stabilizing spring 148. In the example shown in FIG. 1A the guide assembly 142 includes a first end 150 of the guide assembly 142 and a second end 152 of the guide assembly 142. In some examples, the guide assembly 142 may be mounted so that the first end 150 is oriented toward the lower fork tube 116 and the second end 152 is oriented toward the handlebars 126.

In some examples, the guide assembly 142 may be configured to guide the counterweight for movement in a linear motion along a guide assembly axis 160. In some examples, the lower fork tubes 116 move relative to the upper fork tubes 118 in a linear motion along a fork axis 162.

In some examples, the mounting assembly 136 may be configured to attach the guide assembly 142 to the bike 100 in an orientation in which the guide assembly axis 160 is substantially parallel to the axis 162 of the linear motion of lower fork legs 116 of the forks 114 relative to upper fork legs 118 of the forks 114.

As shown in FIG. 1 through FIG. 9, the bike 100 is moving from the right to the left and the ground 104 is moving from the left to the right under the bike 100. As shown in FIG. 1A the front wheel 120 is rolling along a smooth part of the ground 104 and the forks 114 are at the riding sag position. As a result, the suspension stabilizer 110 is shown with the counterweight 140 in a neutral position with no other force other than gravity acting on the suspension stabilizer 110.

FIG. 2A depicts an illustration of the bike 100 and suspension stabilizer 110 shown in FIG. 1A during an impact with the bump 106. FIG. 2B depicts a diagrammatic cut-away view of the suspension stabilizer 110 shown in FIG. 2A during the impact with the bump 106. In FIG. 2A, the bike 100 has moved relative to the bike 100 shown in FIG. 1A and the front wheel 120 has impacted the bump 106. This impact causes the forks 114 to begin to compress, during which the lower fork tubes 116 move upward into the upper fork tubes 118, and the front wheel 120 moves upward toward the handlebars 126. Although the forks 114 absorb some of the impact, the forks 114 do not absorb all of the impact and so part of the impact force is transferred to the upper fork tubes 118. The suspension stabilizer 110, as shown in FIG. 2B, reacts to the impact force transferred to the upper fork tubes 118 and the guide assembly first end 150 moves toward the counterweight 140 and at least partially compresses the lower stabilizing spring 146.

Since the counterweight 140 has a mass, and therefore inertia, the counterweight 140 resists the movement of the impact by tending to stay in position while the upper fork tubes 118 and the attached guide assembly 142 move relative to the counterweight 140. The counterweight 140 resists the movement of the upper fork tubes 118 through the spring assembly 144; and the suspension stabilizer 110 absorbs some of the impact at the upper fork tubes 118, thereby reducing some of the impact that reaches the handlebars 126 and the rider's hands 128.

FIG. 3A depicts an illustration of the bike 100 and suspension stabilizer 110 shown in FIG. 1A following the initial impact with the bump 106 shown in FIG. 2A. FIG. 3B depicts a diagrammatic cut-away view of the suspension stabilizer 110 shown in FIG. 3A. In FIG. 3A, the bike 100 has moved relative to the bike 100 shown in FIG. 2A and the front wheel 120 has bounced from the bump 106. This impact causes the forks 114 to continue to compress, and the front wheel 120 moves continues to move upward toward the handlebars 126. In the suspension stabilizer 110, as shown in FIG. 3B, the counterweight 140 continues to compress the lower stabilizing spring 146, and/or the lower stabilizing spring 146 may be fully compressed. The suspension stabilizer 110 shown in FIG. 3A may have absorbed the highest force, or fastest change in the position of the front wheel 130, that the impact transfers from the front wheel 130. In other words, the suspension stabilizer 110 may have taken the sharpness out of the impact. In some examples, the counterweight 140 stays down as the impact continues.

FIG. 4A depicts an illustration of the bike 100 and suspension stabilizer 110 shown in FIG. 1A following the impact with the bump 106 and after the position of the bike 100 shown in FIG. 3A. FIG. 4B depicts a diagrammatic cut-away view of the suspension stabilizer 110 shown in FIG. 4A. In FIG. 4A, the bike 100 has moved relative to the bike 100 shown in FIG. 3A and the impact causes the forks 114 to bottom out and the front wheel 120 stops moving upward toward the handlebars 126. The suspension stabilizer 110, as shown in FIG. 4B, continues to compress the lower stabilizing spring 146, and/or the lower stabilizing spring 146 may be fully compressed. In some examples, the fork 114 bottoms and the counterweight 140 changes direction.

FIG. 5A depicts an illustration of the bike 100 and suspension stabilizer 110 shown in FIG. 1A following the impact with the bump 106 and after the position of the bike 100 shown in FIG. 4A. FIG. 5B depicts a diagrammatic cut-away view of the suspension stabilizer 110 shown in FIG. 5A. In FIG. 5A, the bike 100 has moved relative to the bike 100 shown in FIG. 4A. Following the forks 114 bottoming out, the fork springs begin to extend the forks 114 and move the front wheel 120 back toward the ground 104. As the fork 114 begins to extend the counterweight 140 travels up to counter the force of fork extension. The counterweight 140 is moved away from the first end 150 of the guide assembly 142 toward the second end 152 of the guide assembly 142 by the force of the lower stabilizing spring 146.

FIG. 6A depicts an illustration of the bike 100 and suspension stabilizer 110 shown in FIG. 1A following the impact with the bump 106 and after the position of the bike 100 shown in FIG. 5A. FIG. 6B depicts a diagrammatic cut-away view of the suspension stabilizer 110 shown in FIG. 6A. In FIG. 6A, the bike 100 has moved relative to the bike 100 shown in FIG. 5A and the forks 114 continue to extend under the force of the fork springs. The suspension stabilizer 110 absorbs some of the force of the extension of the forks 114 that may otherwise be transferred to the handlebars 126 and the rider's hands 128. In some examples, the counterweight 140 tops out to soften the extension of the forks 114 in that the counterweight 140 may fully compress the upper stabilizing spring 148. In some examples, the upper stabilizing spring 148 is partially or fully compressed between the counterweight 140 and the second end 152 of the guide assembly 142.

FIG. 7A depicts an illustration of the bike 100 and suspension stabilizer 110 shown in FIG. 1A following the impact with the bump 106 and after the position of the bike 100 shown in FIG. 6A. FIG. 7B depicts a diagrammatic cut-away view of the suspension stabilizer 110 shown in FIG. 7A. In FIG. 7A, the bike 100 has moved relative to the bike 100 shown in FIG. 6A and the forks 114 continue to extend under the force of the fork springs until the front wheel 120 contacts the ground 104. In some examples, the upper stabilizing spring 148 may continue to be partially or fully compressed between the counterweight 140 and the second end 152 of the guide assembly 142.

FIG. 8A depicts an illustration of the bike 100 and suspension stabilizer 110 shown in FIG. 1A following the impact with the bump 106 and after the position of the bike 100 shown in FIG. 7A. FIG. 8B depicts a diagrammatic cut-away view of the suspension stabilizer 110 shown in FIG. 8A. In FIG. 8A, the bike 100 has moved relative to the bike 100 shown in FIG. 7A. As shown in FIG. 8A, the forks 114 may begin to compress again and the front wheel 120 may move off of the ground. The suspension stabilizer 110 may counteract the force of the fork compression by compressing the lower stabilizing spring 146 between the first end 150 of the guide assembly 150 and the counterweight 140.

Figure 7:
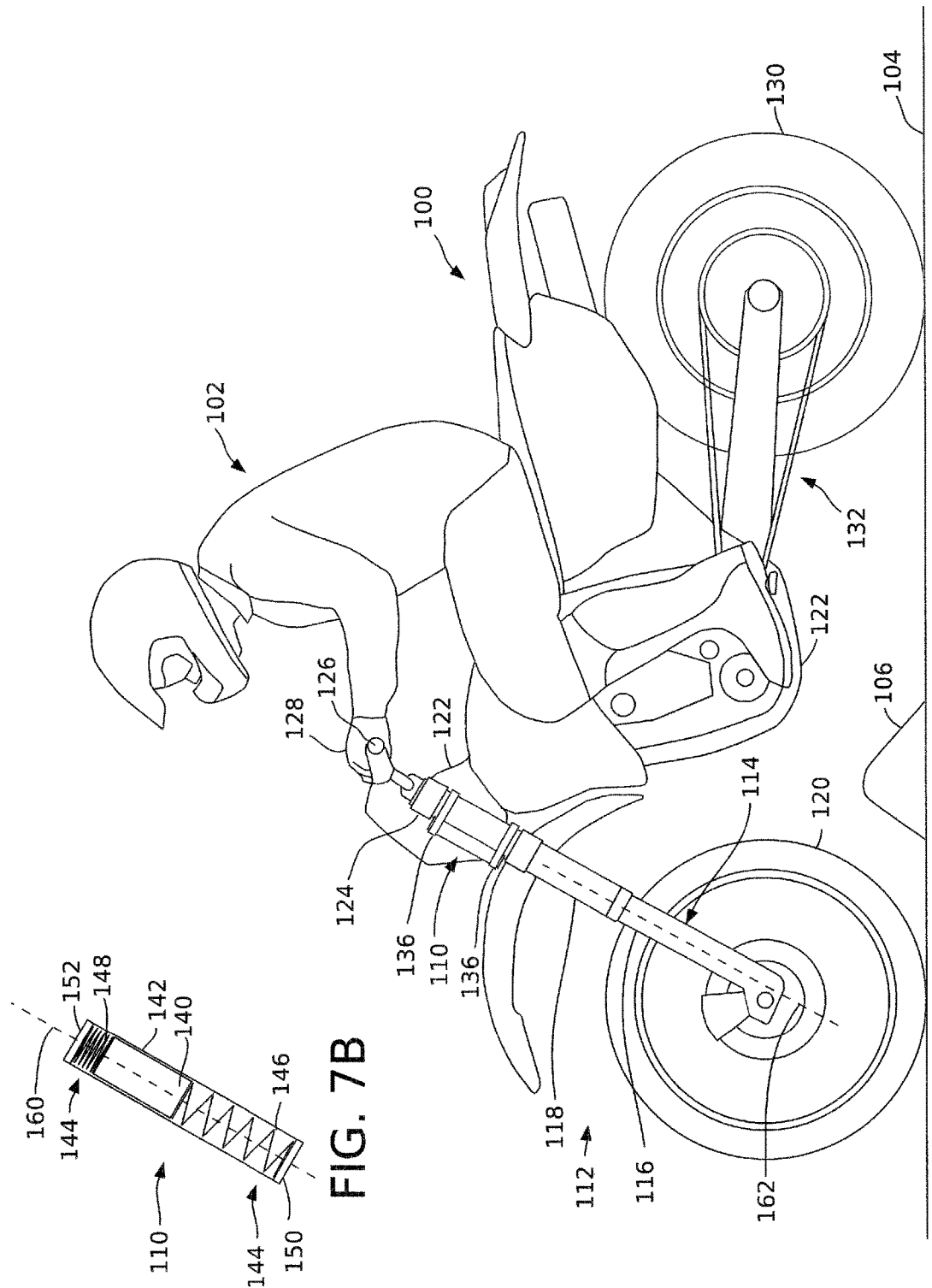
FIG. 7A depicts an illustration of the bike and suspension stabilizer after the position shown in FIG. 6A, according to one or more embodiments described.
FIG. 7B depicts a diagrammatic cut-away view of the suspension stabilizer shown in FIG. 7A.
Figure 8:
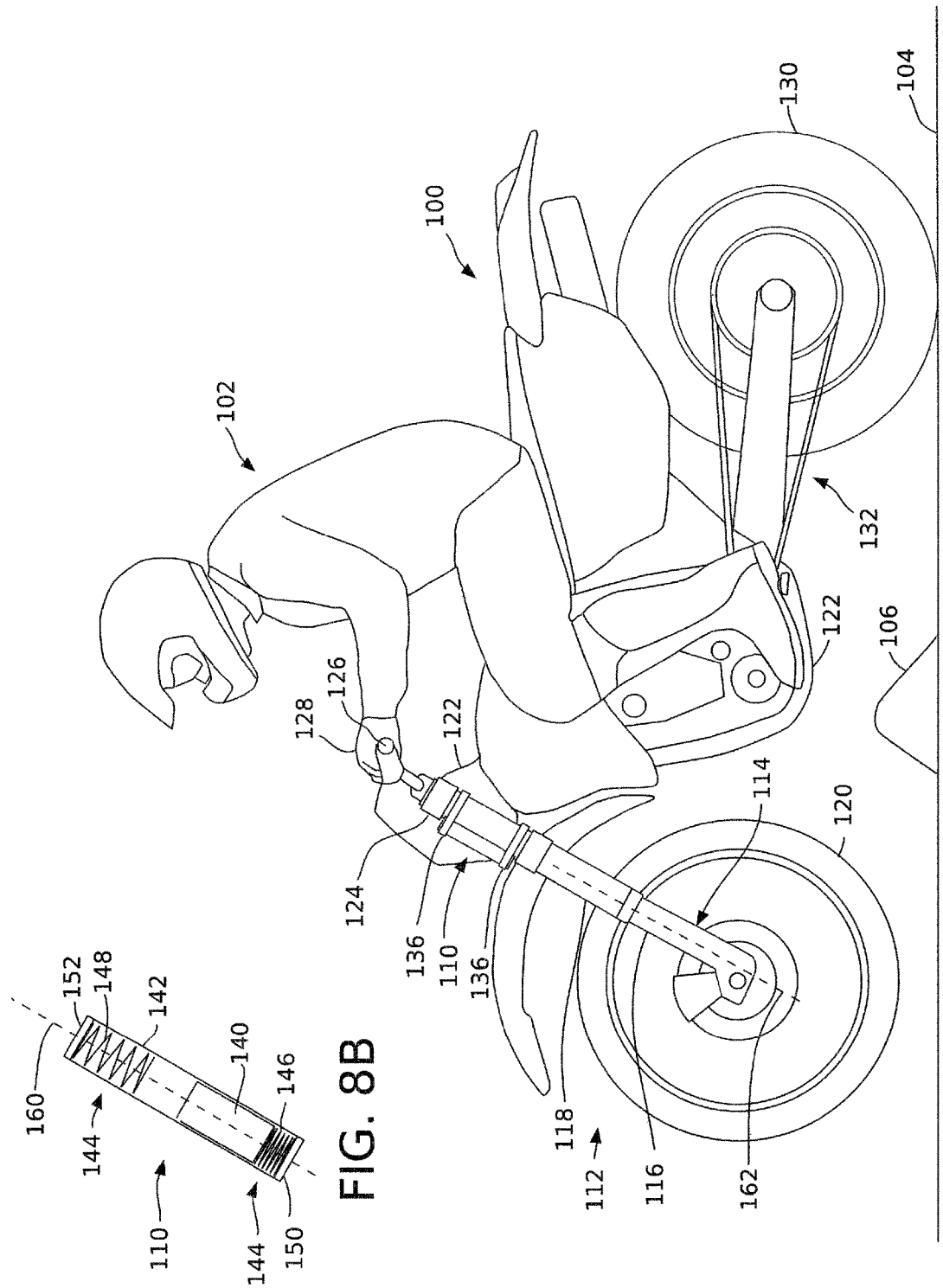
FIG. 8A depicts an illustration of the bike and suspension stabilizer after the position shown in FIG. 7A, according to one or more embodiments described.
FIG. 8B depicts a diagrammatic cut-away view of the suspension stabilizer shown in FIG. 8A.
Figure 9:
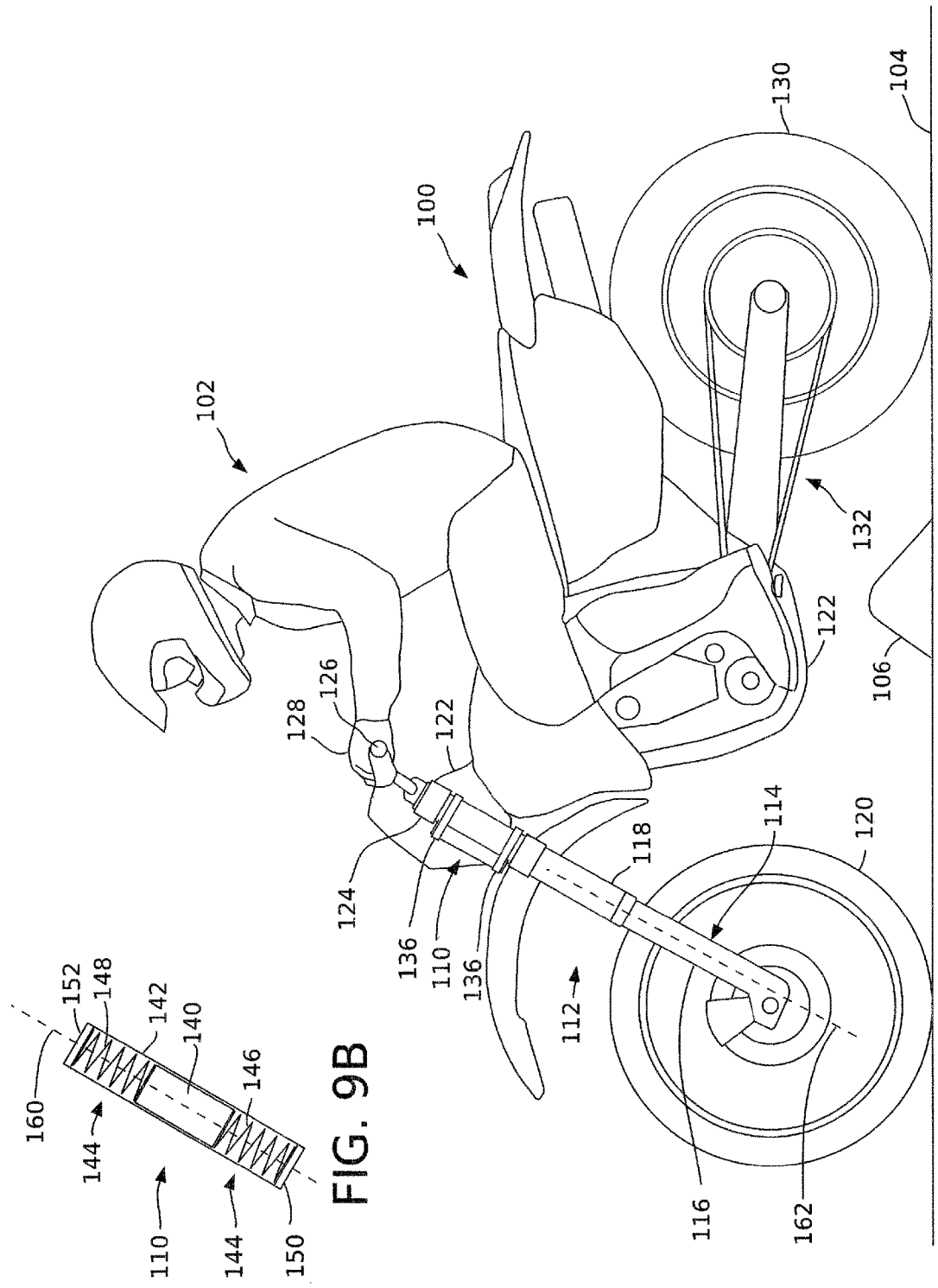
FIG. 9A depicts an illustration of the bike and suspension stabilizer after the position shown in FIG. 8A, according to one or more embodiments described.
FIG. 9B depicts a diagrammatic cut-away view of the suspension stabilizer shown in FIG. 9A.

FIG. 9A depicts an illustration of the bike 100 and suspension stabilizer 110 shown in FIG. 1A following the impact with the bump 106 and after the position of the bike 100 shown in FIG. 8A. FIG. 9B depicts a diagrammatic cut-away view of the suspension stabilizer 110 shown in FIG. 9A. In FIG. 9A, the bike 100 has moved relative to the bike 100 shown in FIG. 8A. As shown in FIG. 9A, the forks 114 may again contact the ground and the bike 100 may be settled back to the riding sag as shown in FIG. 1A. In some examples, the forks 114 may exhibit a resonant frequency oscillation induced at least in part by the fork springs. FIG. 7 through FIG. 9 illustrate an example natural frequency of oscillation which may be seen in the front suspension 112 of the bike 100. The natural frequency is the frequency that the forks 114 oscillate in response to an impact at the front wheel 120. In some examples, the natural frequency of the forks 114 may be from 3 to 8 Hertz (Hz), from 3 to 10 Hz, from 3 to 15 Hz from 4 to 10 Hz from 4 to 11 Hz, or other ranges which may be determined by measurement, and the counterweight 140 and spring assembly 144 may be selected to have a natural frequency of motion that is in one of these ranges.

The natural frequency of motion may be the natural frequency of the counterweight 140 when oscillating with one or more spring forces of the spring assembly 144. In some examples, the counterweight 140 and spring assembly 144 may be selected so that oscillations of the counterweight 140 are out of phase with oscillations of the front wheel 120. In some examples, the counterweight 140 and spring assembly 144 may be selected such that oscillations of the counterweight 140 are 180 degrees out of phase with oscillations of the front wheel 120. In some examples, the position and/or orientation of the counterweight 140 and/or spring assembly 144 may be selected so that the counterweight 140 provides the greatest countering force to the motion of the front wheel 120; and in some examples, this includes orienting the counterweight 140 for linear motion that is parallel to motion of the forks 114.

Figure 10:
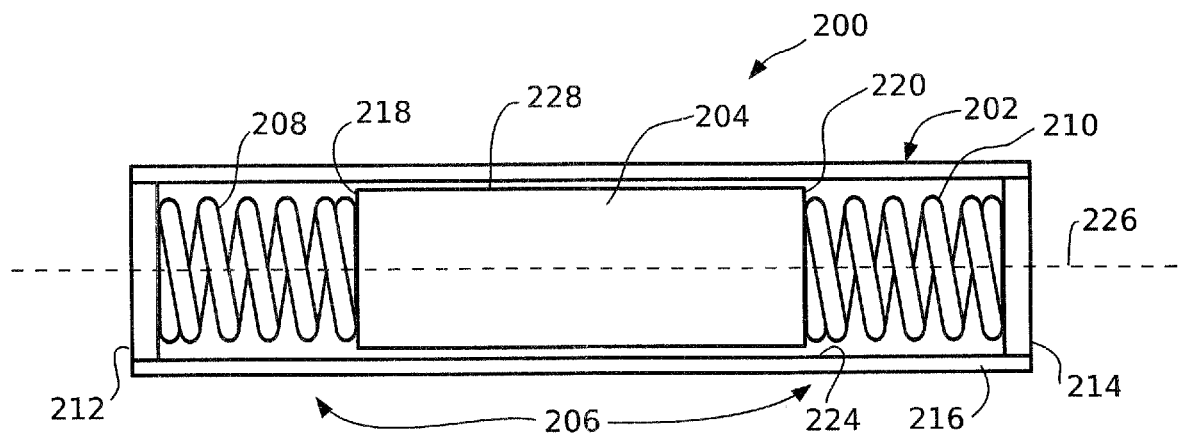
FIG. 10 depicts a partial cut-away view of a suspension stabilizer, according to one or more embodiments described.

FIG. 10 depicts a suspension stabilizer 200 according to some examples. Suspension stabilizer 200 is shown with a guide assembly 202 that is cut away to show a counterweight 204, and a spring assembly 206 that includes a first stabilizing spring 208 and a second stabilizing spring 210. In some examples, the first stabilizing spring 208 may be considered a lower stabilizing spring and the second stabilizing spring 210 may be considered an upper stabilizing spring, or vice versa, depending on the mounted orientation of the suspension stabilizer 200. In some examples, the counterweight may be made from lead, steel, stainless steel, cast iron, metal, or other material that provides the weight and/or size desired. In some examples, the counterweight 204 may be other sizes and/or shapes than shown.

The guide assembly 202 includes a first end 212 and a second end 214 and a body 216. In some examples, the body 216 may extend between the first end 212 and the second end 214. The counterweight 204 may include a first surface portion 218 and a second surface portion 220. In some examples, the first end 212 and/or the second end 214 may be an end cap, and in some examples the end cap may be removable from the guide assembly body 216. In some examples, the first stabilizing spring 208 may be attached to the counterweight 204, such as at the first surface 218 of the counterweight 204, and/or may be attached to the first end 212 of the guide assembly 202. In some examples, the second stabilizing spring 210 may be attached to the counterweight 204, such as at the second surface 220 of the counterweight 204, and/or may be attached to the second end 214 of the guide assembly 202.

In some examples, the body 216 of the guide assembly 202 may define a guide path 224 which may guide the counterweight 204 for movement in a linear motion along a guide assembly axis 226. In some examples, a portion of the guide assembly axis 226 may correspond to the linear motion path of the counterweight 204. In some examples, the guide assembly body 216 may include a hollow cylindrical shape or tube and the guide path 224 may be an inner surface of the guide assembly body 216. In some examples, the counterweight 204 may have a cross section shape that is similar to a cross section shape of the guide assembly 202, and in some examples the cross section shape may be circular, square, rectangular, or other shape.

In some examples, the guide assembly 202 may be cylindrical and the guide assembly axis 226 may be the axis of the cylinder. In some examples, the counterweight 204 may include a cylindrical shape having an outer surface 228 that slides relative to the inner surface of the guide assembly 202. In some examples, an outer diameter of the outer surface 228 of the counterweight 204 may be smaller than an inner diameter of the guide assembly 202. In some examples, the guide assembly 202 may define an inner cavity that includes the guide path 224 and the inner cavity may contain a fluid, such as air, nitrogen, liquid, oil and/or other fluid that may be or may flow between the guide assembly 202 and the counterweight 204; in some examples, the inner cavity may contain a vacuum or a pressure.

Figure 2:
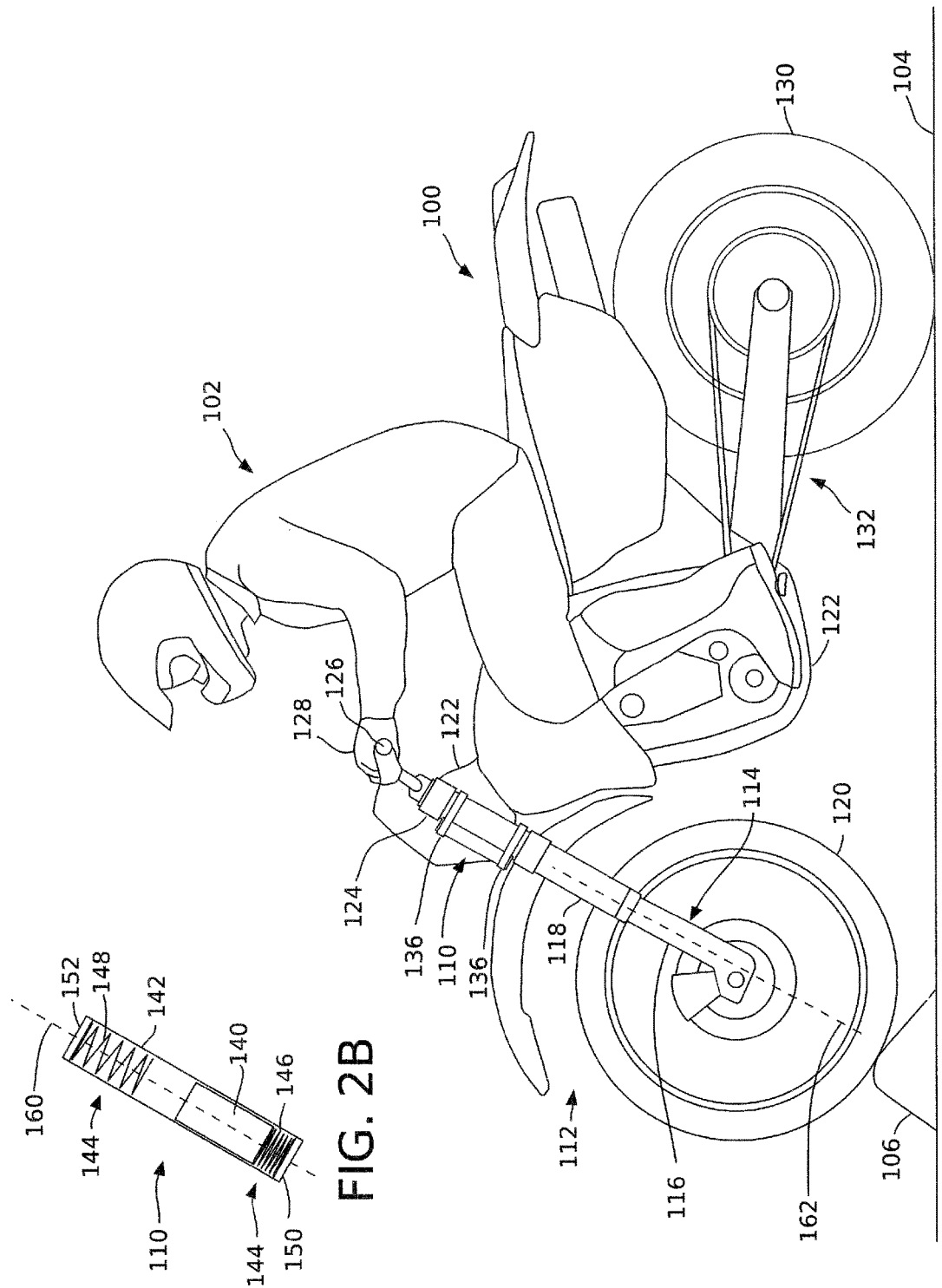
FIG. 2A depicts an illustration of the bike and suspension stabilizer shown in FIG. 1A during an impact with a bump, according to one or more embodiments described.
FIG. 2B depicts a diagrammatic cut-away view of the suspension stabilizer shown in FIG. 2A during the impact with the bump.
Figure 3:
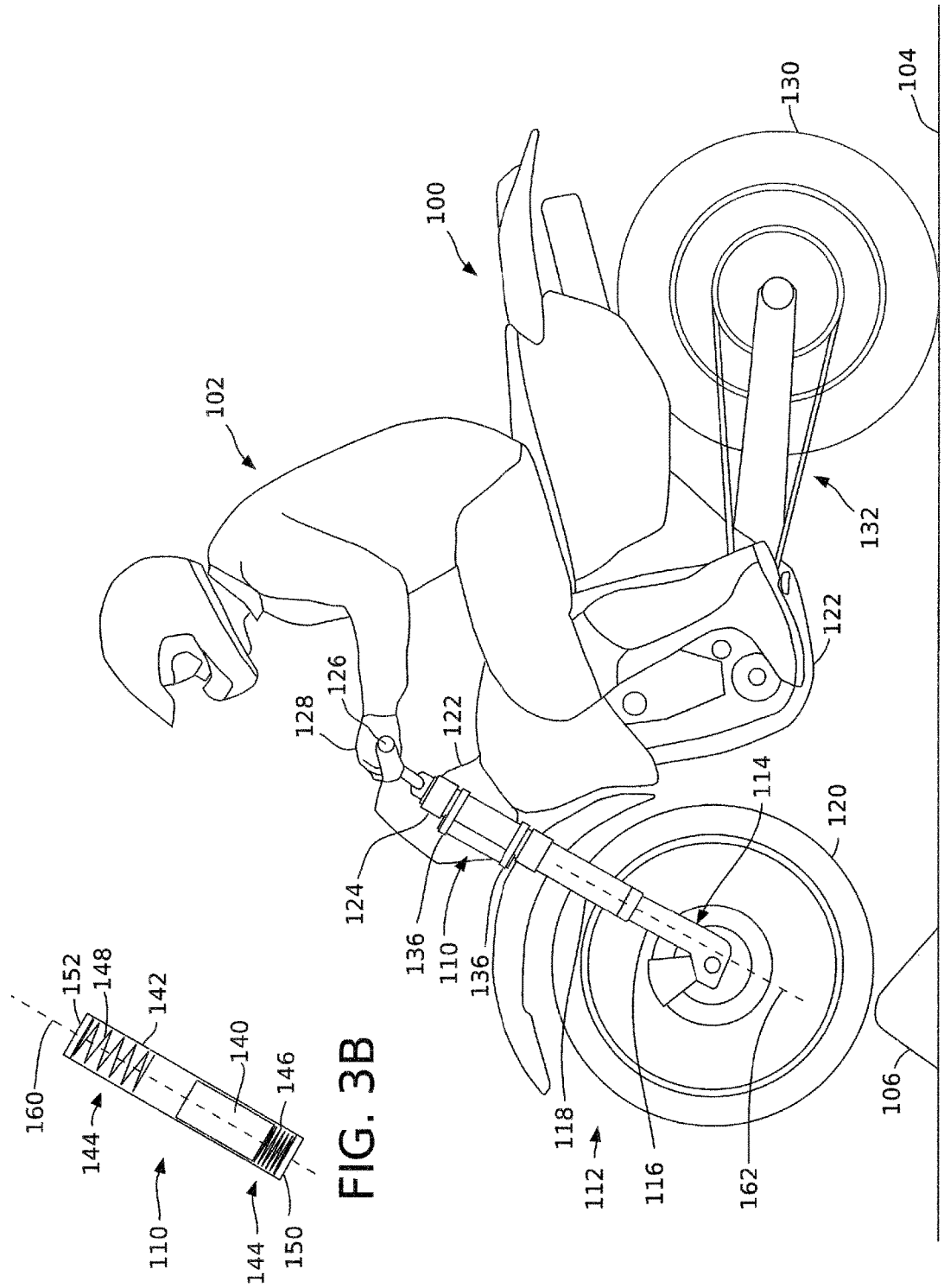
FIG. 3A depicts an illustration of the bike and suspension stabilizer after the impact with the bump shown in FIG. 2A, according to one or more embodiments described.
FIG. 3B depicts a diagrammatic cut-away view of the suspension stabilizer shown in FIG. 3A.
Figure 4:
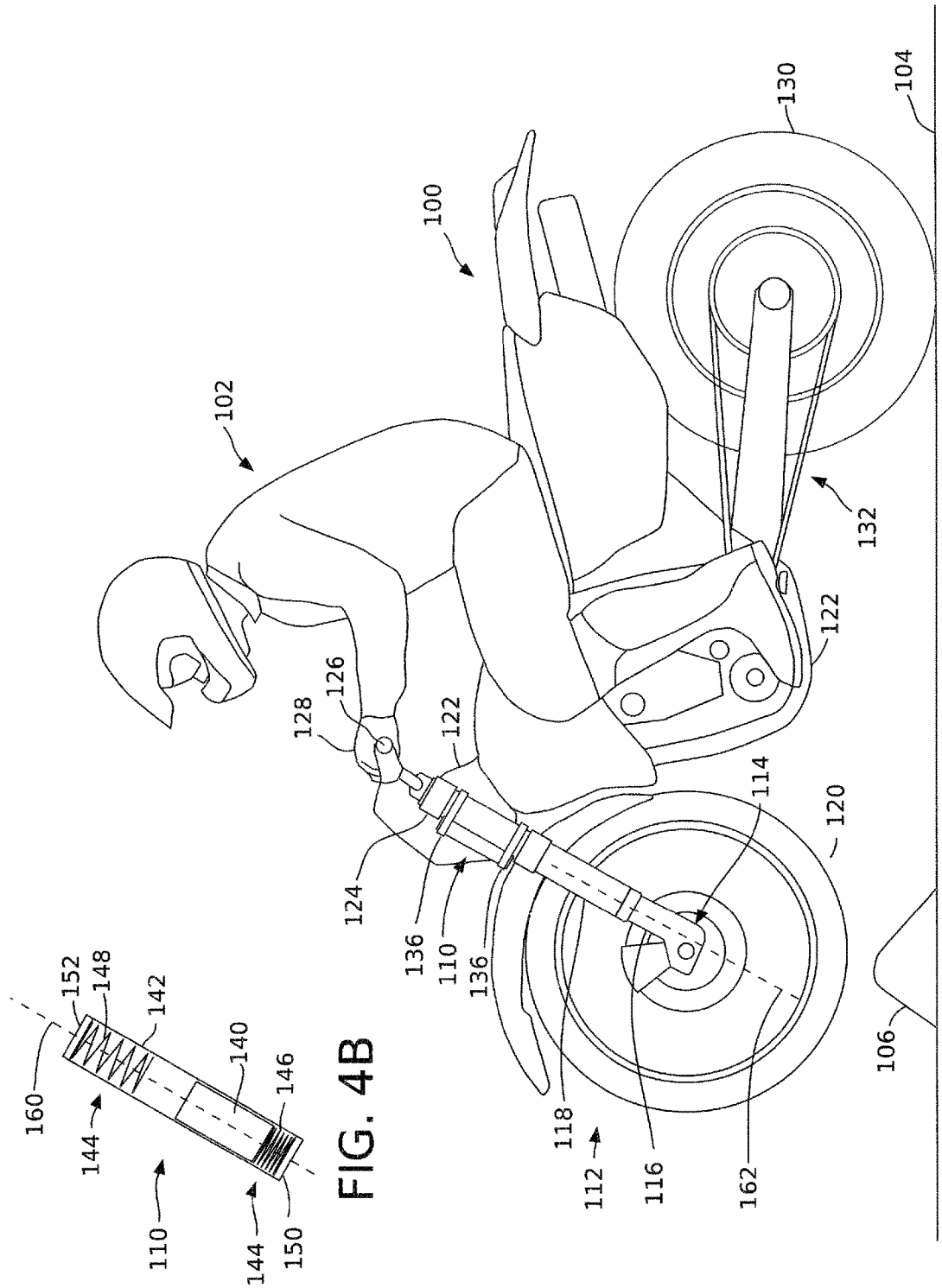
FIG. 4A depicts an illustration of the bike and suspension stabilizer after the position shown in FIG. 3A, according to one or more embodiments described.
FIG. 4B depicts a diagrammatic cut-away view of the suspension stabilizer shown in FIG. 4A.
Figure 5:
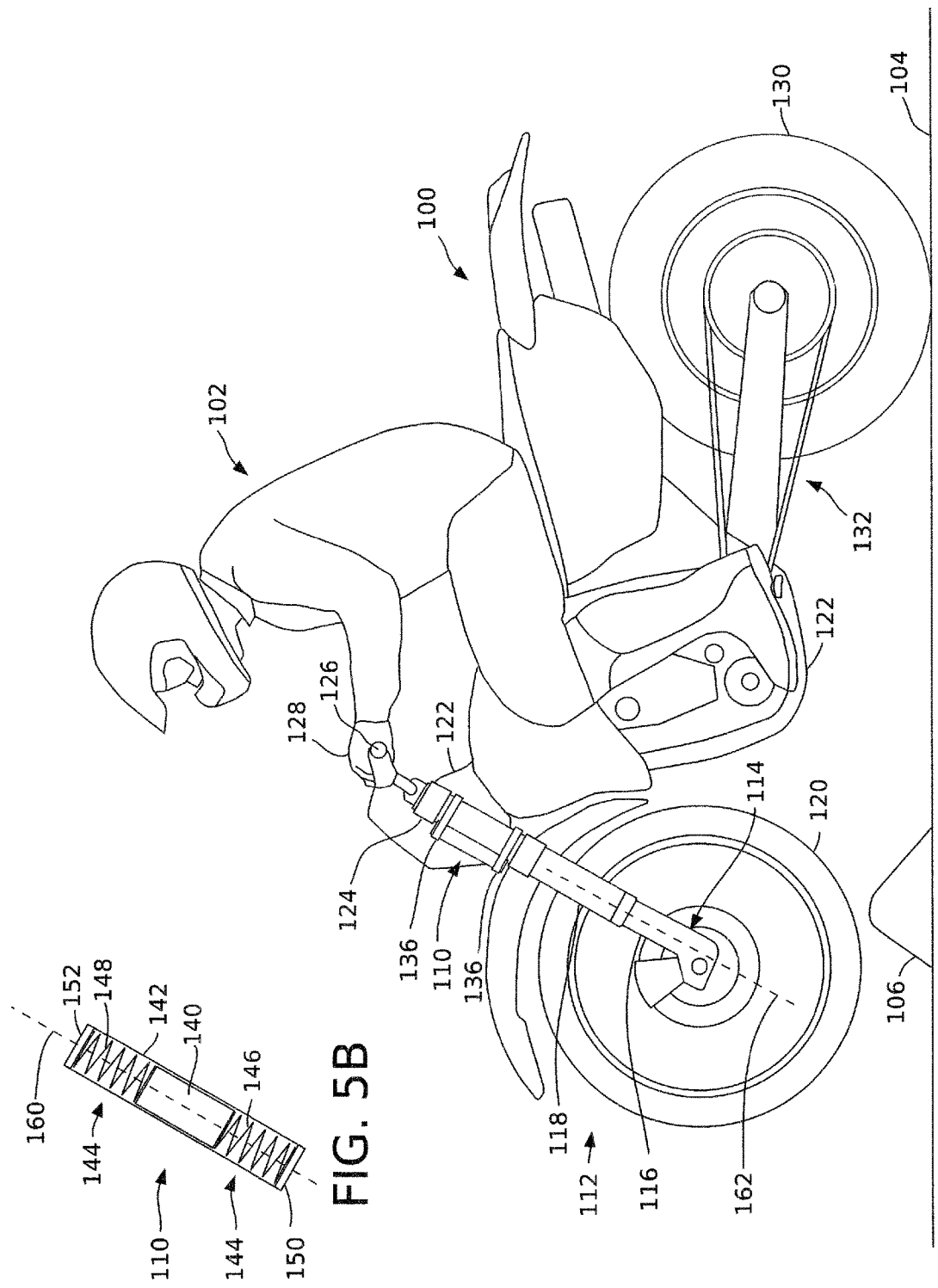
FIG. 5A depicts an illustration of the bike and suspension stabilizer after the position shown in FIG. 4A, according to one or more embodiments described.
FIG. 5B depicts a diagrammatic cut-away view of the suspension stabilizer shown in FIG. 5A.
Figure 6:
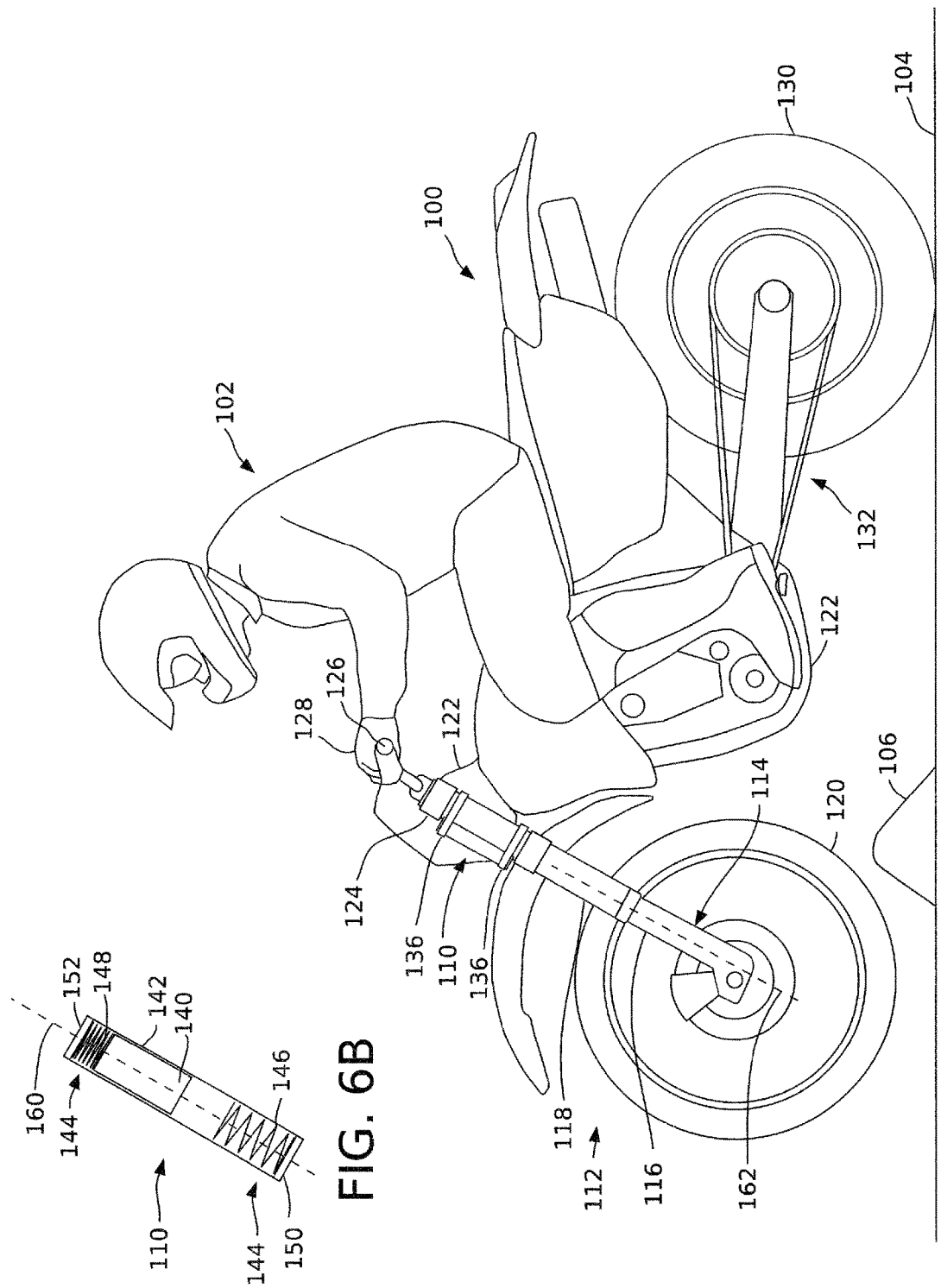
FIG. 6A depicts an illustration of the bike and suspension stabilizer after the position shown in FIG. 5A, according to one or more embodiments described.
FIG. 6B depicts a diagrammatic cut-away view of the suspension stabilizer shown in FIG. 6A.
Figure 11:
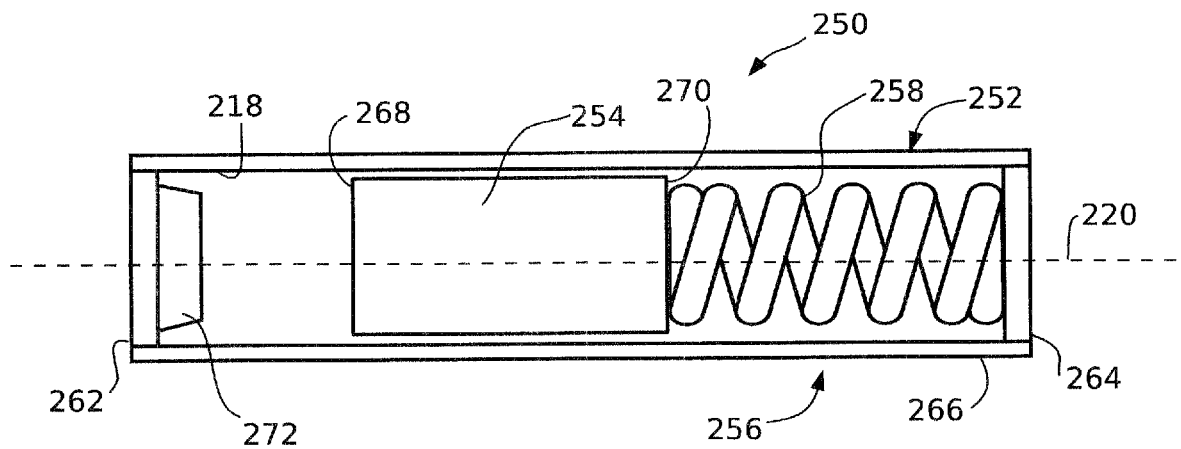
FIG. 11 depicts a partial cut-away view of another suspension stabilizer, according to one or more embodiments described.

FIG. 11 depicts a suspension stabilizer 250 according to some examples. Suspension stabilizer 250 is shown with a guide assembly 252 that is cut away to show a counterweight 254, and a spring assembly 256 that includes a stabilizing spring 258. The guide assembly 252 includes a first end 262 and a second end 264 and a body 266. The counterweight 254 may include a first surface portion 268 and a second surface portion 270. In some embodiments, the spring assembly 256 may have a single spring. In the example shown in FIG. 11, the stabilizing spring 258 is attached to the second surface portion 270 of the counterweight 254 and the second end 264 of the guide assembly 252. The guide assembly may have a guide path 218 and may define a guide assembly axis 220. The suspension stabilizer 250 may include a bottoming bumper 272 which may contact the first surface portion 268 of the counterweight 254 when the stabilizing spring 258 extends to a certain extent, such as during or as a result of an impact at the bike front wheel 120 (FIG. 2). The bottoming bumper 272 may prevent the counterweight 254 from contacting the first end 262 of the guide assembly 252 and may provide a soft stop for the counterweight. The bottoming bumper 272 may be made from rubber, foam, or other material that may soften the impact of the counterweight 254.

Figure 12:
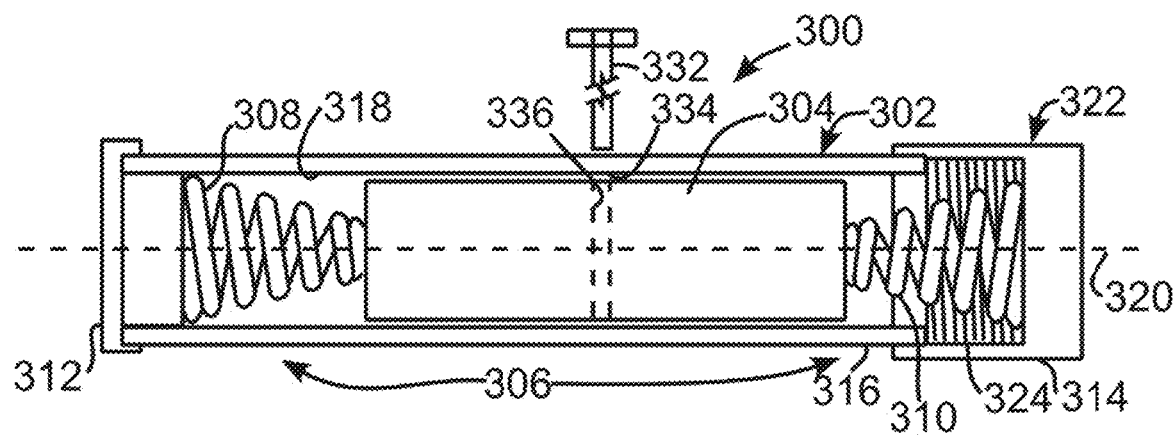
FIG. 12 depicts a partial cut-away view of another suspension stabilizer, according to one or more embodiments described.

FIG. 12 depicts a suspension stabilizer 300 according to some examples. Suspension stabilizer 300 is shown with a guide assembly 302 that is cut away to show a counterweight 304, and a spring assembly 306 that includes a first stabilizing spring 308 and a second stabilizing spring 310. In the example shown in FIG. 12, the first stabilizing spring 308 and second stabilizing spring 310. The guide assembly 302 may include a first end 312 and a second end 314 and a body 316. The guide assembly may have a guide path 318 and may define a guide assembly axis 320. In some examples, the first end 312 and/or the second end 314 may include threads and end caps that may be attached to the body 316 using the threads. In some examples, such as shown in FIG. 12, one or both of the first end 312 and second end 314 may be or include a threaded cap 322 that may include threads 324 for connecting to the guide assembly body 316. In some examples, the threads 324 may have a length that allows the threaded cap 322 to be adjusted closer or further from the first end 312, which in some examples may be used to adjust a pre-load on the spring assembly 306.

In some examples, the spring assembly may include one or more coil spring, compression spring, extension spring or other type of spring that is suitable for resisting the linear motion of the counterweight. In some examples, the spring assembly may include one or more springs that are linear rate, progressive rate, and/or dual rate. In some examples, the spring assembly may be made from or include metal, such as steel, titanium, or other suitable metal or material. In some examples, the spring assembly may be or include an air spring.

In some examples, the guide assembly may be made from or include a metal, such as steel, aluminum, titanium, magnesium or other suitable metal, or a plastic, or carbon fiber, or other suitable material.

As shown in FIG. 12, the suspension stabilizer 300 may include a lockout mechanism 330. The lockout mechanism 330 may include one or more lockout pin 332, one or more guide assembly lockout slot or hole 334, and one or more counterweight lockout slot or hole 336. The lockout pin 332 may be inserted through the guide assembly lockout hole 334 and the counterweight lockout hole 336 to restrain the counterweight 304 to prevent linear motion of the counterweight 304 along the guide assembly axis 322. The lockout mechanism 330 may have other configurations that restrain the counterweight to prevent linear motion, such as one or more bolt, screw, pin, and/or other fastener.

Figure 13:
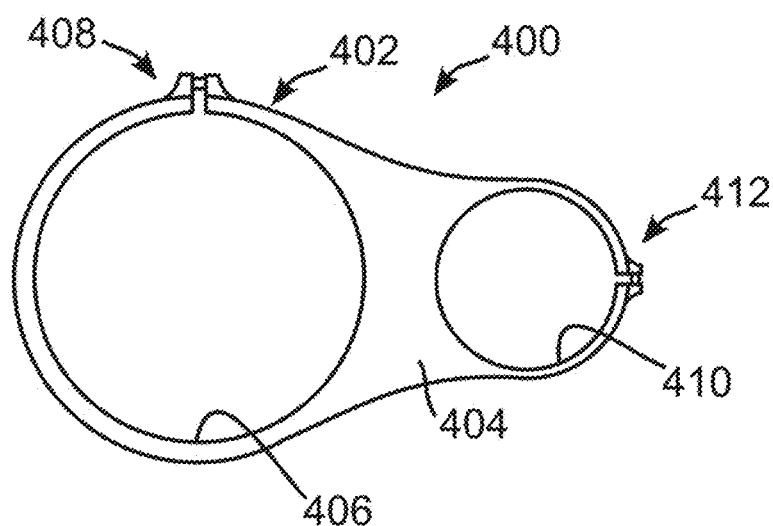
FIG. 13 depicts a view of a mounting assembly of the suspension stabilizer, according to one or more embodiments described.

FIG. 13 depicts a mounting assembly 400 according to some examples. The mounting assembly 400 may include one or more mounts, such as mount 402. Mount 402 may include a body 404 that defines a first bore 406 and may have a tensioner arrangement 408 for adjusting the first bore 402. Body 404 may also define a second bore 410 and may have a tensioner arrangement 412 for adjusting the second bore 410. In some examples, the first bore 406 may have a diameter which allows the first bore 406 to wrap around an upper fork tube, such as upper fork tube 118 shown in FIG. 1. The tensioner arrangement 408 may be used to tighten the first bore 406 around the upper fork tube to secure the mount 402 to the upper fork tube. In some examples the tensioner arrangement 408 may include a bolt, screw or other fastener. In some examples, the second bore 410 may have a diameter which allows the second bore 410 to wrap or attach to the guide 402, such as in guide assembly 142 shown in FIG. 1. The tensioner arrangement 412 may include a bolt, screw or other fastener to tighten the second bore around the guide assembly.

In some examples, the mounting assembly may include two mounts 402, such as shown in FIG. 1. In some examples, the mounting assembly may be formed as part of the guide assembly, and in some examples, the mount may not include the second bore. In some examples, the mounting assembly may have another configuration which allows the mounting assembly to attach the guide assembly to the front of the bike.

In some examples, there may be multiple suspension stabilizers mounted on the bike. In some examples the spring assemblies and counterweights of the multiple suspension stabilizers may be selected based at least in part on the natural frequency of the forks. In some examples, the natural motion frequency of the suspension stabilizer may be based on those frequencies that are transmitted through the standard front fork suspension without adequate attenuation. In some examples, the suspension stabilizer may be integrated into or form part of the forks. For example, the guide assembly, counterweight, and spring assembly may be mounted on the inside of the upper fork tube. In some examples, the suspension stabilizer may be integrated into a portion of the bike frame, such as frame 122 shown in FIG. 1. For example, the counterweight and spring assembly may be mounted in the steering head of the frame and the steering head or the steering stem of the triple clamps may form part or all of the guide assembly. In some examples, the guide assembly may be or include a rod and the counterweight may define a bore. For example, the counterweight may slide along the rod and the spring assembly may include one or more spring that wraps around the rod to resist the linear motion of the counterweight along the rod. In this example, the guide assembly may also include ends that maintain the counterweight and spring assembly on the rod.

Figure 14:
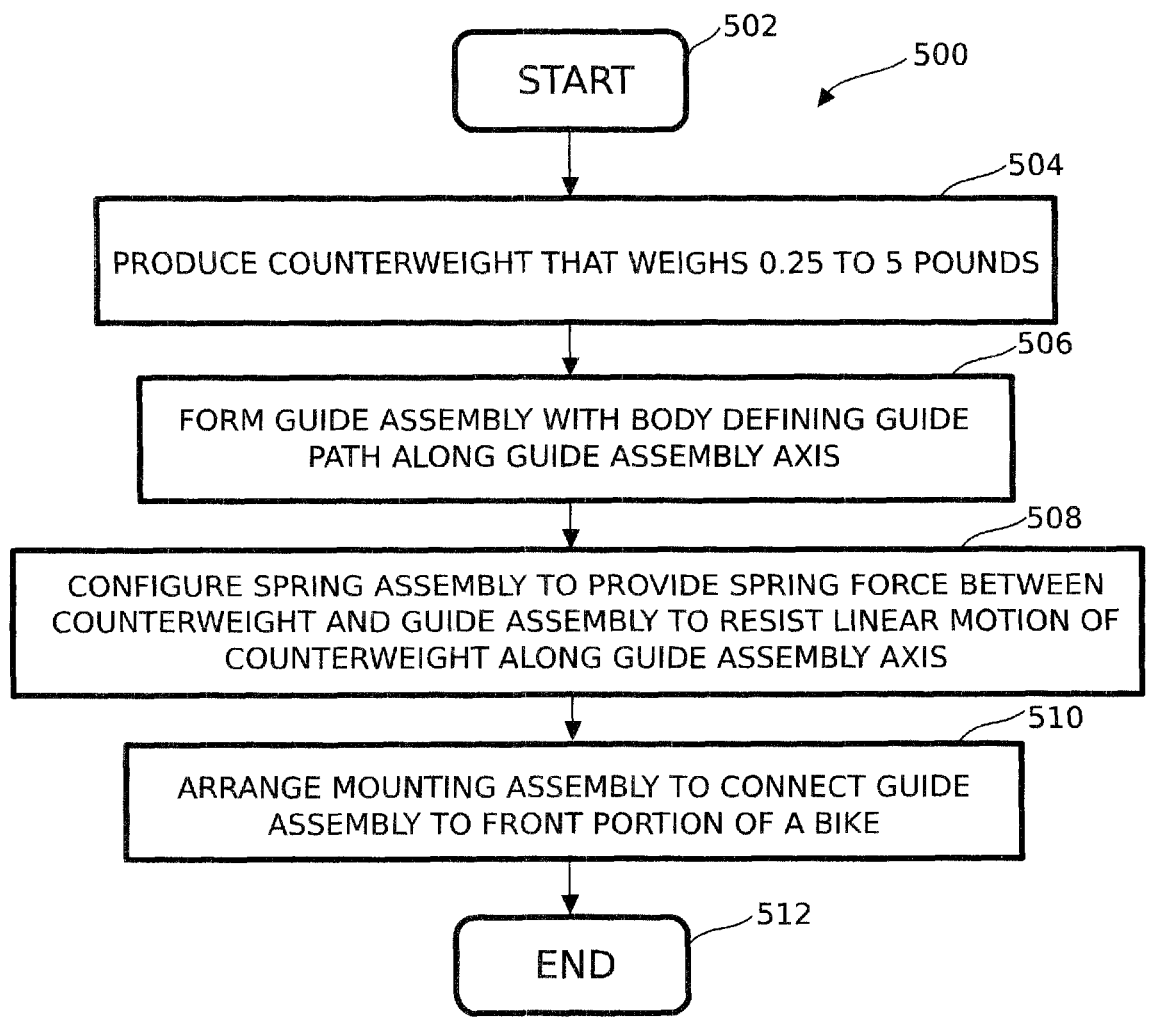
FIG. 14 is a flow diagram of a method.

FIG. 14 is a flow chart that represents a method 500. Method 500 begins at 502 and proceeds to 504 where a counterweight is produced to have a weight that is in a range of 0.25 pounds to 5 pounds. Method 500 then proceeds to 506 where a guide assembly is formed with a body defining a guide path along a guide assembly axis, the guide assembly is formed to receive the counterweight and to guide the counterweight for movement in a linear motion along the guide assembly axis, the guide assembly including a first end, and a second end, and the body extends between the first end and the second end. Method 500 then proceeds to 508 where a spring assembly is configured to provide a spring force between the counterweight and the guide assembly to resist linear motion of the counterweight along the guide assembly axis, wherein spring assembly is selected to have a spring rate such that the spring assembly and counterweight have a natural motion frequency of 3 to 15 Hertz. Method 500 then proceeds to 510 where a mounting assembly is arranged to connect the guide assembly to a front portion of a bike having front fork suspension in an orientation in which the guide assembly axis is substantially parallel to an axis of linear motion of lower fork legs of the forks relative to upper fork legs of the forks. Method 500 then proceeds to 512 where the method 500 ends. Method 500 may be performed in the order shown in FIG. 14 or in other orders.

Although the preceding description has been described herein with reference to particular means, materials, and embodiments, it is not intended to be limited to the particulars disclosed herein; rather, it extends to all functionally equivalent structures, processes, and uses, such as are within the scope of the appended claims.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A suspension stabilizer configured to stabilize a front fork suspension of a bike, the suspension stabilizer comprising:
   a counterweight having a weight that is in a range of 0.25 to 5 pounds, the counterweight including a first surface portion and a second surface portion;
   a guide assembly having a body defining a guide path along a guide assembly axis, the guide path configured to receive the counterweight and to guide the counterweight for movement in a linear motion along the guide assembly axis, the guide assembly including a first end, and a second end, and the body extends between the first end and the second end;
   a spring assembly arranged to provide a spring force between the counterweight and the guide assembly to resist linear motion of the counterweight along the guide assembly axis, wherein the counterweight and spring assembly have a natural motion frequency of 3 to 15 Hertz; and
   a mounting assembly configured to attach the guide assembly to the bike in an orientation in which the guide assembly axis is substantially parallel to an axis of linear motion of lower fork legs of the front fork suspension relative to upper fork legs of the front fork suspension, wherein the mounting assembly is configured to attach the guide assembly to one of the upper fork legs of the front fork suspension.

2. The suspension stabilizer as defined in claim 1, wherein the natural motion frequency of the counterweight and spring assembly is based on a natural frequency of the front fork suspension.

3. The suspension stabilizer as defined in claim 1, wherein the spring assembly includes a first stabilizing spring that is between the first surface portion of the counterweight and the first end of the guide assembly.

4. The suspension stabilizer as defined in claim 1, wherein the spring assembly includes a second stabilizing spring that is between the second surface portion of the counterweight and the second end of the guide assembly.

5. The suspension stabilizer as defined in claim 4, wherein the spring assembly includes a first stabilizing spring that is between the first surface portion of the counterweight and the first end of the guide assembly, wherein the first stabilizing spring is attached to the first end of the guide assembly, wherein the second stabilizing spring is attached to the second end of the guide assembly, wherein the first stabilizing spring and the second stabilizing spring are conical coil springs with a progressive spring rate.

6. The suspension stabilizer as defined in claim 1, wherein the spring assembly is attached to the guide assembly and/or the counterweight.

7. The suspension stabilizer as defined in claim 1, further comprising a bottoming bumper positioned between the first surface portion of the counterweight and the first end of the guide assembly.

8. The suspension stabilizer as defined in claim 1, wherein the bike is a motorcycle and the weight of the counterweight is in a range of 1 pound to 2 pounds.

9. The suspension stabilizer as defined in claim 1, wherein the bike is a bicycle and the weight of the counterweight is in a range of 0.25 pounds and 0.75 pounds.

10. The suspension stabilizer as defined in claim 1, wherein the counterweight and spring assembly have a natural motion frequency of 3 to 8 Hertz.

11. The suspension stabilizer as defined in claim 1, further comprising a lockout mechanism that is configured to selectively restrain the counterweight to prevent linear motion along the guide assembly axis.

12. The suspension stabilizer as defined in claim 1, wherein the guide assembly body comprises a hollow cylinder.

13. The suspension stabilizer as defined in claim 1, wherein the spring assembly includes a first stabilizing spring and a second stabilizing spring and one of the first stabilizing spring and second stabilizing spring is longer than the other of the first stabilizing spring and second stabilizing spring.

14. The suspension stabilizer as defined in claim 1, wherein the spring assembly is arranged such that the spring assembly resists linear motion of the counterweight along the guide assembly axis by spring compression.

15. The suspension stabilizer as defined in claim 1, wherein the spring assembly is arranged such that the spring assembly resists linear motion of the counterweight along the guide assembly axis by spring extension.

16. A method, comprising:
producing a counterweight to have a weight that is in a range of 0.25 pounds to 5 pounds;
forming a guide assembly with a body defining a guide path along a guide assembly axis, the guide assembly formed to receive the counterweight and to guide the counterweight for movement in a linear motion along the guide assembly axis, the guide assembly including a first end, and a second end, and the body extends between the first end and the second end;
configuring a spring assembly to provide a spring force between the counterweight and the guide assembly to resist linear motion of the counterweight along the guide assembly axis, wherein the spring assembly is selected to have a spring rate such that the spring assembly and counterweight have a natural motion frequency of 3 to 15 Hertz; and
arranging a mounting assembly to connect the guide assembly to a front portion of a bike having a front fork suspension in an orientation in which the guide assembly axis is substantially parallel to an axis of linear motion of lower fork legs of the front fork suspension relative to upper fork legs of the front fork suspension, wherein the mounting assembly attaches the guide assembly to one of the upper fork legs of the front fork suspension.

17. The method as defined in claim 16, wherein the bike is a motorcycle, and the weight of the counterweight is in a range of 1 pound to 2 pounds, and the spring rate of the spring assembly is selected such that the spring assembly and counterweight have a natural motion frequency of 3 to 10 Hertz.

18. The method as defined in claim 16, wherein the bike is a bicycle, and the weight of the counterweight is in a range of 0.25 pound to 0.75 pounds, and the spring rate of the spring assembly is selected such that the spring assembly and counterweight have a natural motion frequency of 4 to 11 Hertz.

19. A front fork suspension of a bike, the front fork suspension comprising:
lower fork legs;
upper fork legs, wherein the upper fork legs are sprung by one or more springs disposed inside at least the lower fork legs or the upper fork legs; and
a suspension stabilizer, wherein the suspension stabilizer is configured to stabilize the front fork suspension, the suspension stabilizer comprising:
a counterweight having a weight that is in a range of 0.25 to 5 pounds, the counterweight including a first surface portion and a second surface portion;
a guide assembly having a body defining a guide path along a guide assembly axis, the guide path configured to receive the counterweight and to guide the counterweight for movement in a linear motion along the guide assembly axis, the guide assembly including a first end, and a second end, and the body extends between the first end and the second end;
a spring assembly arranged to provide a spring force between the counterweight and the guide assembly to resist linear motion of the counterweight along the guide assembly axis, wherein the counterweight and spring assembly have a natural motion frequency of 3 to 15 Hertz; and
a mounting assembly, wherein the mounting assembly attaches the guide assembly to the front fork suspension in an orientation in which the guide assembly axis is substantially parallel to an axis of linear motion of lower fork legs of the front fork suspension relative to upper fork legs of the front fork suspension, wherein the mounting assembly attaches the guide assembly to one of the upper fork legs of the front fork suspension.

20. The front fork suspension of claim 19, wherein the lower fork legs are configured to couple to a front wheel of the bike, wherein the upper fork legs are configured to couple to a frame of the bike.

* * * * *